July 2, 1940.  J. H. GLASS ET AL  2,206,396
PHOTOGRAPHIC REPRODUCING APPARATUS
Filed July 6, 1938  3 Sheets-Sheet 1
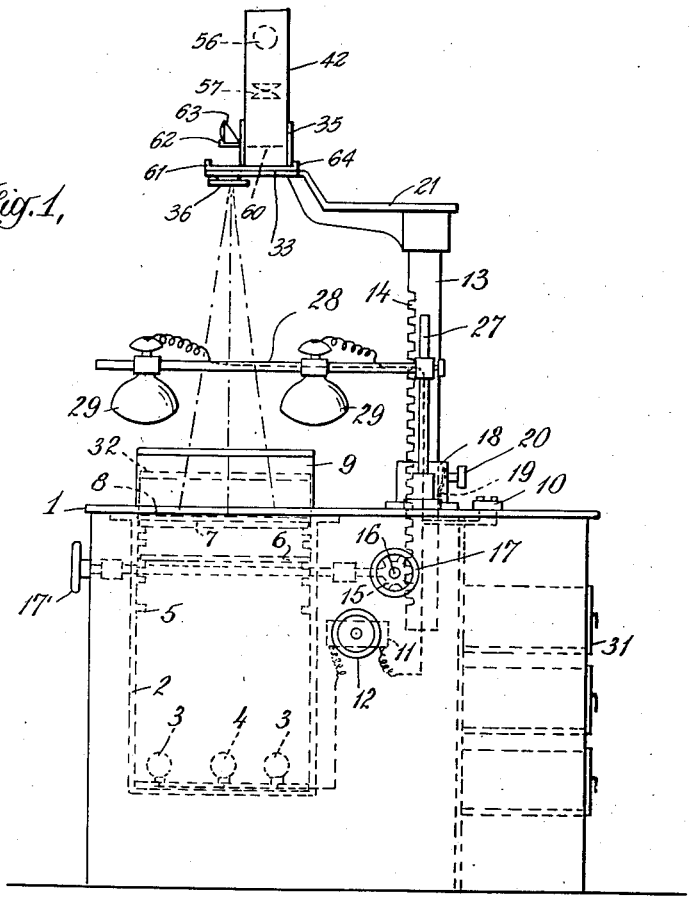
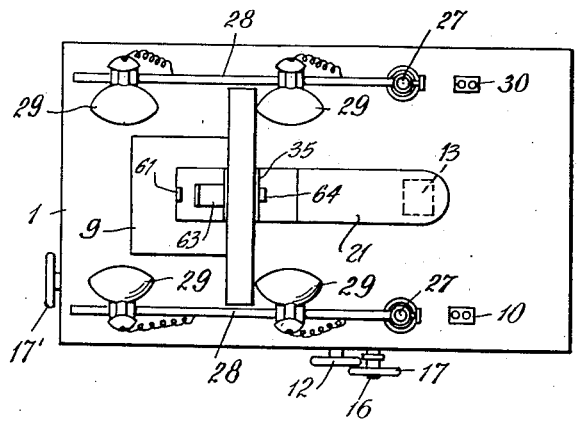
INVENTOR
Jules Henry Glass & Maurice Lezy
BY
Pennie, Davis, Marvin & Edmonds.
ATTORNEY

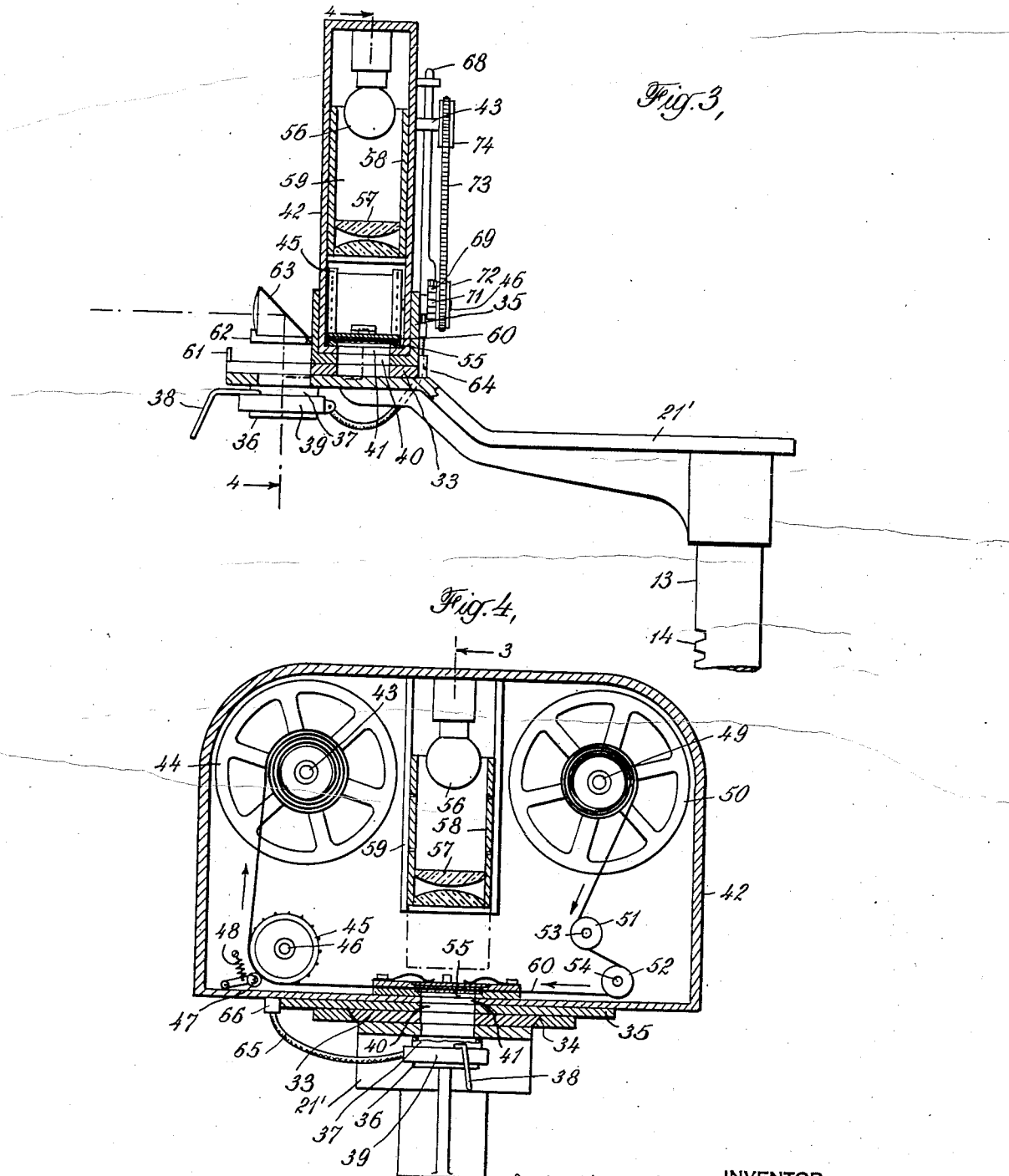

July 2, 1940.  J. H. GLASS ET AL  2,206,396
PHOTOGRAPHIC REPRODUCING APPARATUS
Filed July 6, 1938  3 Sheets-Sheet 3
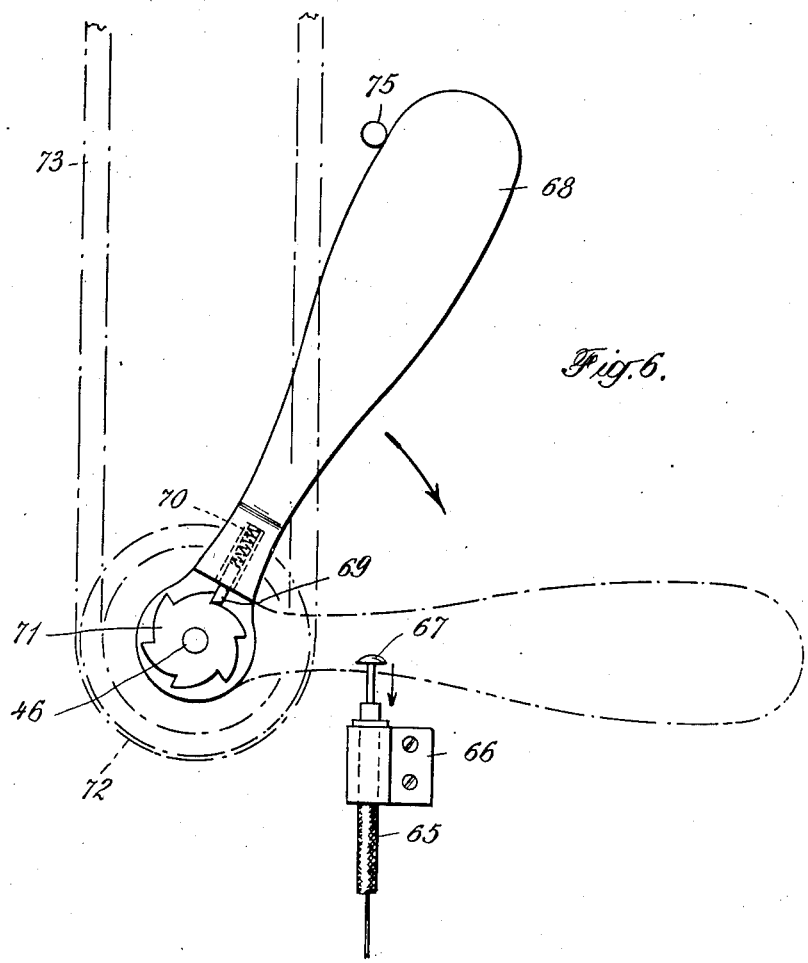

Patented July 2, 1940

2,206,396

UNITED STATES PATENT OFFICE 2,206,396

PHOTOGRAPHIC REPRODUCING APPARATUS

Jules Henry Glass and Maurice Lezy, Paris, France

Application July 6, 1938, Serial No. 217,695
In Belgium July 9, 1937

2 Claims. (Cl. 88—24)

This invention relates to reproducing apparatus whereby reproductions may be made on the same scale as the original by contact printing or on different scales by optical means.

An object of the present invention is the production of a combined photographic contact printer and a camera provided with a lens or rectifier to assemble in a single apparatus the units necessary for printing and reproduction of documents or other papers on the same or different scales. The prints may be made on glass, negatives, films or sensitized papers and the apparatus permits the examination and inspection of the negatives or documents as desired by reflection or by transparency. A further object of the invention is the provision of a contact printer and a camera with the optical axis of the camera arranged substantially in alignment with the axis of the printer.

Still another object is to provide a camera with a lens mounted on the exterior of the camera and means whereby the lens may be brought into alignment with the printing frame for focusing the object to be photographed.

In the accompanying drawings we have shown several forms of the invention. In this showing:

Fig. 1 is a side elevation of the apparatus, parts being shown in section;

Fig. 2 is a plan view;

Fig. 3 is a front elevation of the camera supporting means with the camera carried thereby, the camera being shown in section;

Fig. 4 is a view of the moving picture camera at right angles to Fig. 1 with the side of the camera open;

Fig. 5 is a longitudinal, sectional view of the feed guide and presser frame; and Fig. 6 is a detailed view of the film feeding mechanism.

In the form of the invention shown, the apparatus consists of a cabinet 1, in which is arranged a lighting box or compartment 2. A plurality of white lamps 3 is arranged in the box and one or more red or orange lamps 4 may also be arranged in the box. The side walls of the box are provided with slides 5 for the reception of one or more plates or masks 6 of frosted glass. A clear glass 7 is placed on top of the box and is adapted to receive the negative to be reproduced by contact printing. The sensitized paper, film or layer of sensitized material on glass is arranged over the negative in the usual manner being inserted through an opening 8 in the top of the cabinet. A hinged cover 9 closes this opening and serves to press the sensitized film or plate against the negative to be reproduced. The supporting glass 7 is preferably mounted on spring supports to permit a certain flexibility of operation.

The lamps within the lighting box are controlled by a switch 10 arranged on the top of the cabinet and within easy reach of the operator. A rheostat 11, controlled by a handle 12 permits regulation of the intensity of the lamps. An exposure meter or an automatic time cut-out (not shown) may be connected to the switch 10.

The top of the cabinet is provided with an opening for the reception of a vertical column 13. This column is provided with rack teeth 14 adapted to engage a pinion 15 located within the cabinet. The pinion is mounted on a shaft 16 which is provided with a hand wheel or crank 17 on the outside for operation of the shaft. Standard 13 passes through a sleeve 18 which is mounted on the top of the cabinet and this sleeve carries a brake 19 which engages the standard. A set screw 20 is also provided for locking the standard in adjusted positions.

A pair of vertical arms 27 are mounted on the top of the cabinet, each of which supports a horizontal arm 28 carrying lamps or projectors 29. The arms 28 are vertically adjustable and the lamps may also be adjusted on these arms so as to properly illuminate that part of the top of the cabinet which is situated in the field of the lens. When the projectors are not in use during printing the lamps may be swung out of the way. The lamps are controlled by a switch 30 mounted on the top of the cabinet.

A supporting plate 21 is then mounted on top of the post or standard 13 and forms a support for the camera. The support 21 carries a dove-tail plate 33 (Fig. 4) which is adapted to receive a U-shaped support or camera holder 35. The plate 33 and the holder 35 are provided with the interfitting dove-tail 34 so that the holder 35 is mounted on the plate to permit sliding without play. Adjacent the front of the plate 33 an opening is provided beneath which is arranged a lens 36. This lens is mounted on a fitting 37 carried by the plate 33 and is adapted to be adjusted to regulate the axial displacement of the lens. A handle 38 is provided for adjusting the lens 36 for focusing.

The camera holder 35 is also provided with an opening 40 of the size of the opening in the plate and a window 41 in the camera 42 is arranged in alignment with this opening when the camera is mounted in the holder. As shown in Fig. 4, the camera consists of three compartments. A freely mounted shaft 43 is mounted in one compartment and is adapted to receive a take-up reel 44 for the film. A toothed drum 45 is mounted on a shaft 46 below the reel 44. A pressure roll 47 is arranged adjacent the drum and is controlled by a spring 48.

In the opposite compartment a similar shaft 49 is adapted to receive a reel 50 containing the unexposed film and from the reel 50 the film passes over freely mounted rollers 51 and 52 mounted on shafts 53 and 54. A pressure frame 55 is arranged in alignment with the window or opening 41 in the camera frame.

The central compartment of the camera houses a lighting device consisting of a lamp 56 and a condenser lens 57 mounted in a metal casing 58. The casing is slidably mounted in the wall 59 of the central compartment and this wall is provided with staggered openings to permit ventilation of the lamp.

The film 60 is fed through the pressure frame and arranged on the take-up reel in the usual manner. With the camera in the position shown in Fig. 3 of the drawings, the camera window or opening 41 is out of alignment with the lens 36. The camera is provided with focusing means carried by the U-shaped frame or camera holder 33 and consisting of a support 62 carrying a prism lens 63, the lower surface of which is frosted. With the parts in the position shown in Fig. 3 of the drawings and with the camera holder 33 engaging stop 64, the lens 63 is arranged above the lens 36 to permit examination of the projected image and proper focusing of the camera. After the camera has been focused, the camera holder 33 is moved to the left in Fig. 3 of the drawings until it engages stop 61 at which time the camera window 41 is then in alignment with the lens 36 and the camera properly focused for the taking of a picture.

The actual photographing is carried out in the usual manner by operation of the shutter 39. Operation of the shutter 39 is effected by means of a flexible cable release 65, the operating head of which is fastened to the casing 35 by member 66. The control button 67 of the shutter cable is located in the path of a handle 68 (see Fig. 6). This handle rotates freely on the film feeding drum 46 and is provided with a pawl 69 projected by spring 70 which engages the teeth of a ratchet 71 keyed to the shaft 46. Shaft 46 is provided with a grooved pulley 72 and shaft 43 is provided with a similar pulley 74. A belt 73 extends over these pulleys.

In operation the opening of the lens is therefore caused by operation of the handle 68 coming in contact with the shutter release button 67. When the handle is raised to its initial position pawl 69 engages one of the teeth of ratchet 71 and drives the drum to feed the film a proper distance for taking up the previously exposed film. The travel of handle 68 may be controlled by a stop 75 so that the proper amount of film is fed to the take-up reel 44 following each exposure. The window of the camera is provided with a removable glass 77 (see Fig. 5) serving as a support for the film. The presser frame 55 is likewise provided with a removable glass 78 to clamp the film against the glass 77 and prevent it from buckling. This arrangement also permits projection of recorded films by means of the projecting device carried by the camera. When the device is so used, metal plate 79 which is arranged over the pressure frame and retained in position by springs 80 is removed. The film may then be fed in the usual manner and illuminated by the lamp 56. Condenser lens may be properly focused by sliding the sleeve or casing 58 to the dotted line position shown in Fig. 4.

In photographing negatives to be reproduced a removable frame 32 (Fig. 1) can be fitted into the opening 8 of the cabinet and provided with a glass on which the negatives may be placed.

From the foregoing it will be apparent that the apparatus may be used for printing positive films from negative films by use of the contact printer or it may be used for printing by simultaneously winding the negative film and the unexposed film on reel 50 and feeding them through the camera and illuminating them by the projectors 29. The images of the film may also be projected on to the table 1 for inspection and the device may be used for reproducing images on photographic paper, film or the like of any desired scale.

We claim:

1. Apparatus of the character described comprising a cabinet, contact printing mechanism mounted in said cabinet, a camera support mounted on said cabinet, a substantially U-shaped camera frame carried by said support and being laterally adjustable, a camera mounted in the frame and having an opening coinciding with an opening in the frame for exposure of the film in the camera when the frame is in one position, and a rectifier lens mounted on said frame and adapted for use in focusing said camera when the frame is in its second position.

2. Apparatus of the character described comprising a cabinet, contact printing mechanism mounted in said cabinet, a camera support mounted on said cabinet, said support comprising a dove-tailed plate having an opening therein, a substantially U-shaped camera frame carried by said support having an interfitting dove-tail engaging said dove-tailed plate, a camera mounted in said frame, said camera and said frame being provided with aligned openings, said support being provided with an opening adapted to be aligned with said frame and camera openings when the camera is in one position, and a rectifier lens mounted on said frame and adapted to be aligned with the opening in the support when the camera and frame are in a second position.

JULES HENRY GLASS.
MAURICE LEZY.